3,239,347
ESTROGENIC COMPOUNDS AND ANIMAL
GROWTH PROMOTERS
Edward B. Hodge, Phil H. Hidy, and Herbert L. Wehrmeister, Terre Haute, Ind., assignors to Commercial Solvents Corporation, a corporation of Maryland
No Drawing. Filed Feb. 15, 1965, Ser. No. 432,828
8 Claims. (Cl. 99—2)

The present invention relates to new compounds and an object of the present invention is to provide compounds which exhibit estrogenic activity or aid in increasing the rate of growth in meat-producing animals, e.g., cattle, lamb and swine.

A conventional formula for the compounds of the present invention is:

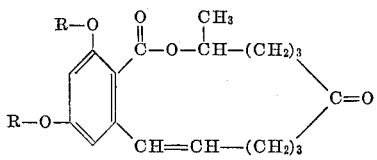

where R is hydrogen or

with at least one R being

and $R_1$ is substituted or unsubstituted alkyl, e.g., lower alkyl such as methyl, ethyl and hexyl, etc. Compounds having the above formula wherein $R_1$ is hydrogen or unsubstituted or substituted aryl, e.g., monoring aromatics such as phenyl and bromophenyl; are also contemplated by the present invention.

The compounds can be administered to animals by any suitable method including oral and parenteral administrations. For example, the compound can be blended with ordinary feed containing nutritional values in an amount sufficient to produce the desired rate of growth and thus be fed directly to the animals, or the compound can be suspended in a suitable injection suspension medium such as peanut oil and injected parenterally. The amount of compound fed to an animal, of course, varies depending upon the animal, desired rate of growth and the like.

When the new compounds are to be administered in feeds, an animal feed composition may be prepared containing the usual nutritionally balanced quantities of carbohydrates, proteins, vitamins and minerals, together with a compound of the present invention. Some of these usual dietary elements are grains, such as ground grain and grain by-products; animal protein substances, such as those found in fish meal and meat scraps; vegetable proteins like soybean oil meal or peanut oil meal; vitaminaceous materials, e.g., vitamin A and D mixtures; riboflavin supplements and other vitamin B complex members; and bone meal and limestone to provide minerals. A type of conventional feed material for use with cattle includes alfalfa hay and ground corn cobs together with supplementary vitaminaceous substances if desired.

The compounds of the present invention can be produced from the compound:

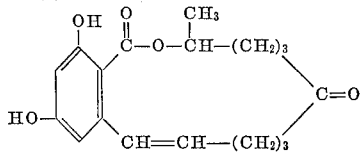

hereinafter referred to as the fermentation estrogenic substance (F.E.S.), by acylation to replace the H atom of one or both of the OH radicals with an acyl radical.

In producing compounds of the present invention where R is acyl, conventional acylation procedures can be used to replace the H atom of both of the OH groups of F.E.S. with an acyl radical. Acylated F.E.S. compounds can be produced, for example, by reaction with the corresponding acid anhydride, e.g., acetic anhydride, propionic anhydride, etc., catalyzed with, for example, sodium acetate or pyridine. Ambient conditions can be used although it is preferred to keep the reaction mixture cold.

The fermentation estrogenic substance (F.E.S.) is so named since a convenient method for producing it is by cultivating, on a suitable nutrient medium, the organism *Gibberella zeae* (Gordon) on deposit at the Northern Utilization Research and Development Division of the United States Department of Agriculture under the number NRRL-2830.

The following examples are offered to illustrate this invention; however, the invention is not limited to the specific materials, amounts, and procedures set forth. The first example illustrates preparation of a suitable inoculum containing the organism *Gibberella zeae* (Gordon) NRRL-2830.

*Example I*

A spore sand culture containing *Gibberella zeae* (Gordon( NRRL-2830 was aseptically placed in a sterile tube containing 15 milliliters of Czapek's-Dox solution and a small amount of agar. This medium was then incubated for about 168 hours at approximately 25° C. At the end of the incubation period, the medium was washed with 5 milliliters of sterile deionized water and transferred to a serile tube containing 45 milliliters of Czapek's-Dox solution. The contents of the tube were then incubated for about 96 hours at about 25° C. after which the material was available for use in inoculation of a fermentation medium.

The following example illustrates the fermentation of the organism *Gibberella zeae* (Gordon) NRRL-2830 to produce F.E.S.

*Example II*

To a 2 liter flask were added 300 grams of finely divided corn. The flask and its contents were then sterilized and after sterilization 150 milliliters of sterile deionized water were added. To the mixture in the flask were then added 45 milliliters of the inoculum prepared by the process of Example I and the material was thoroughly mixed. The mixed material was then incubated for about 20 days at 25° C. in a dark room in a water-saturated atmosphere.

The following example illustrates the recovery of F.E.S. from the fermentation medium.

*Example III*

A 300 gram portion of fermented material produced by the method of Example II was placed in 500 milliliters of deionized water and slurried. The slurry was then heated for about 15 minutes at 75° C., 300 grams of filter aid were then added and the material was filtered. The solid filtered material containing the anabolic substance was then air dried, and 333 grams of the dried cake were then extracted with 500 milliliters of ethanol. This procedure was repeated three more times. The ethanol extract was evaporated to dryness under vacuum to give 6.84 grams of solid material. This solid material was then dissolved in 20 milliliters of chloroform and extracted with 30 milliliters of an aqueous solution containing 5% by weight of sodium carbonate having an adjusted pH of about 11.2. The extraction process was repeated seven more times. The pH of the sodium-carbonate extract was then adjusted to 6.2 with hydrochloric acid, to yield an anabolic substance-containing precipitate. The precipitate and the aqueous sodium carbonate extract were then each in turn extracted with 75 milliliters of ethyl ether. This procedure was repeated three more times to yield a light yellow ethereal solution, which was then evaporated to yield 116 milligrams of solid anabolic substance. This material was then subjected to multiple transfer countercurrent distribution using 100 tubes and a solvent system consisting of two parts chloroform and two parts carbon tetrachloride as the lower phase and four parts methanol and one part water as the upper phase, all parts by volume. The solid material obtained from the multiple transfer countercurrent distribution was F.E.S.

The following examples illustrate the production of acylated F.E.S. compounds.

*Example IV*

To a solution of 368 milligrams of F.E.S. in 8 milliliters pyridine was added 5 milliliters acetic anhydride and the mixture was left at room temperature for 16 hours. Water (25 milliliters) was added and the mixture was stored in a refrigerator for 2 hours. The solid precipitated from the mixture was collected by filtration, washed with water and dried in a vacuum desiccator. There was obtained 274 milligrams of a crude solid, solid A, having a melting point of 77°–81° C. An additional 40 milligrams of a material, solid B, having a melting point of 103°–110° C., was obtained by refiltration of the filtrate from solid A (which included the washings of solid A).

Recrystallization of solid A from a mixture of 20 milliliters methanol and 40 milliliters water provided 187 milligrams material having a melting point of 118°–120° C. A second recrystallization gave 120 milligrams of product having a melting point of 115°–117° C. and the formula:

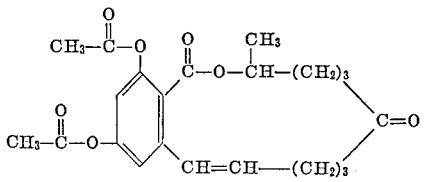

This product gave a negative ferric chloride test. An infrared spectrum indicated the absence of OH groups.

Analysis:

|  | Calc. ($C_{22}H_{26}O_7$) | Found |
| --- | --- | --- |
| Percent C | 65.66 | 65.26 |
| Percent H | 6.51 | 6.67 |

*Example V*

The procedure of Example IV is followed except butyric anhydride is substituted for the acetic anhydride to produce a compound having the formula:

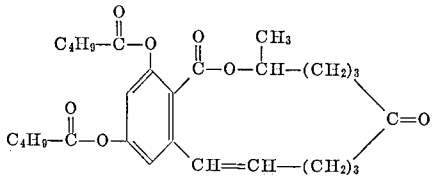

*Example VI*

Six head of cattle are fed a daily ration including a mixture of alfalfa hay and ground corn cobs containing from 1 to 20 ounces of the acylated F.E.S. compound produced in Example IV per hundred pounds of ration.

*Example VII*

The procedure of Example IV is followed except one-half the amount of acetic anhydride is used to produce the compound:

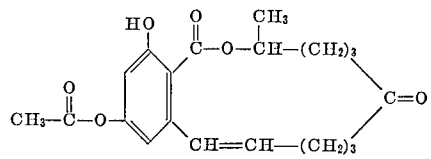

It is claimed:
1.

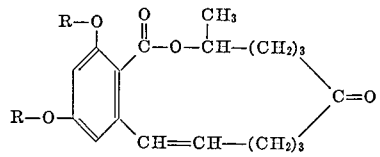

wherein R is hydrogen or

with at least one R being

and $R_1$ is lower alkyl.

2. An animal feed comprising a nutritional diluent and growth promoting amounts of the compound of claim 1.
3. The compound of claim 1 wherein each R is acetyl.
4. The compound of claim 1 wherein each R is butyryl.
5. The compounds of claim 1 wherein the R para to the ester group on the benzene ring is acetyl and the other R is hydrogen.
6. An animal feed comprising a nutritional diluent and growth promoting amounts of the compound of claim 3.
7. An animal feed comprising a nutritional diluent and growth promoting amounts of the compound of claim 4.
8. An animal feed comprising a nutritional diluent and growth promoting amounts of the compound of claim 5.

References Cited by the Examiner

UNITED STATES PATENTS 2,842,051   7/1958   Brian et al. _____ 99—2

OTHER REFERENCES

Stob et al., Nature, vol. 196, page 1318, December 29, 1962.

A. LOUIS MONACELL, *Primary Examiner.*